(12) United States Patent
Chien et al.

(10) Patent No.: US 10,354,681 B1
(45) Date of Patent: Jul. 16, 2019

(54) TUNNEL MAGNETORESISTANCE READ HEAD INCLUDING SIDE SHIELDS CONTAINING NANOCRYSTALLINE FERROMAGNETIC PARTICLES

(71) Applicant: SANDISK TECHNOLOGIES LLC, Addison, TX (US)

(72) Inventors: Chen-Jung Chien, San Jose, CA (US); Daniele Mauri, San Jose, CA (US); Gonçalo Baião De Albuquerque, San Jose, CA (US); Ming Mao, Dublin, CA (US)

(73) Assignee: SANDISK TECHNOLOGIES LLC, Addison, TX (US)

( * ) Notice: Subject to any disclaimer, the term of this patent is extended or adjusted under 35 U.S.C. 154(b) by 0 days.

(21) Appl. No.: 16/021,602

(22) Filed: Jun. 28, 2018

(51) Int. Cl.
*G11B 5/39* (2006.01)
*G11B 5/31* (2006.01)

(52) U.S. Cl.
CPC .......... *G11B 5/3912* (2013.01); *G11B 5/3163* (2013.01); *G11B 5/3909* (2013.01); *G11B 2005/3996* (2013.01); *Y10T 29/49034* (2015.01)

(58) Field of Classification Search
None
See application file for complete search history.

(56) References Cited

U.S. PATENT DOCUMENTS

| | | | |
|---|---|---|---|
| 6,519,121 B1 | 2/2003 | Gill | |
| 6,786,803 B2 | 9/2004 | Crawforth et al. | |
| 6,801,410 B2 | 10/2004 | Xue et al. | |
| 6,963,098 B2 | 11/2005 | Daughton et al. | |
| 6,995,957 B2 | 2/2006 | Jayasekara | |
| 7,582,218 B2 | 9/2009 | Seagle | |
| 7,688,555 B2 | 3/2010 | Zhang et al. | |
| 7,820,455 B2 | 10/2010 | Gill et al. | |
| 8,107,201 B2 | 1/2012 | Zhang et al. | |
| 8,291,743 B1 | 10/2012 | Shi et al. | |
| 8,361,541 B2 | 1/2013 | Lee et al. | |
| 8,375,565 B2 | 2/2013 | Hu et al. | |
| 8,443,510 B1 | 5/2013 | Shi et al. | |
| 8,582,251 B2 | 11/2013 | Gao et al. | |
| 8,717,709 B1 | 5/2014 | Shi et al. | |
| 8,735,565 B2 | 5/2014 | Poyart et al. | |
| 8,964,333 B1 | 2/2015 | Hu et al. | |
| 9,105,568 B2 | 8/2015 | Iuliano et al. | |
| 9,153,261 B1 | 10/2015 | Kerner et al. | |

(Continued)

OTHER PUBLICATIONS

U.S. Appl. No. 15/492,141, filed Apr. 20, 2017, SanDisk Technologies LLC.

*Primary Examiner* — Craig A. Renner
(74) *Attorney, Agent, or Firm* — The Marbury Law Group, PLLC

(57) ABSTRACT

A tunnel magnetoresistance (TMR) read head includes a first magnetic shield, a read sensor stripe located over the first magnetic shield, a second magnetic shield located over the sensor layer stack, an electrical isolation dielectric layer located on sidewalls of the read sensor stripe, and a pair of side shields located on the electrical isolation dielectric layer between the first magnetic shield and the second magnetic shield. The read sensor stripe includes a sensor layer stack containing a pinned layer stack, a non-magnetic electrically insulating barrier layer, and a ferromagnetic free layer. The side shields include nanocrystalline ferromagnetic particles, such as Fe, Co or CoFe, embedded in a non-magnetic dielectric material matrix, such as hafnium oxide.

21 Claims, 15 Drawing Sheets

(56) References Cited

U.S. PATENT DOCUMENTS

| | | |
|---|---|---|
| 9,321,146 B1 | 4/2016 | Rudy et al. |
| 9,390,733 B2 | 7/2016 | Etoh et al. |
| 9,659,706 B2 | 5/2017 | Qiu et al. |
| 2003/0223157 A1 | 12/2003 | Xue et al. |
| 2004/0097173 A1 | 5/2004 | Crawforth et al. |
| 2004/0184196 A1 | 9/2004 | Jayasekara |
| 2005/0002267 A1 | 1/2005 | Daughton et al. |
| 2005/0275975 A1 | 12/2005 | Zhang et al. |
| 2007/0230063 A1 | 10/2007 | Seagle |
| 2009/0162847 A1 | 1/2009 | Poyart et al. |
| 2009/0246890 A1 | 10/2009 | Gill et al. |
| 2010/0172053 A1 | 7/2010 | Zhang et al. |
| 2011/0027618 A1 | 2/2011 | Lee et al. |
| 2011/0051294 A1 | 3/2011 | Gao et al. |
| 2011/0294398 A1 | 12/2011 | Hu et al. |
| 2014/0167193 A1 | 6/2014 | Iuliano et al. |
| 2014/0240074 A1 | 8/2014 | Qiu et al. |
| 2015/0103434 A1 | 4/2015 | Etoh et al. |
| 2015/0260757 A1 | 9/2015 | Li et al. |
| 2015/0287428 A1 | 10/2015 | Kerner et al. |
| 2016/0284989 A1 | 9/2016 | Zheng et al. |
| 2018/0096764 A1 | 4/2018 | Gardner et al. |

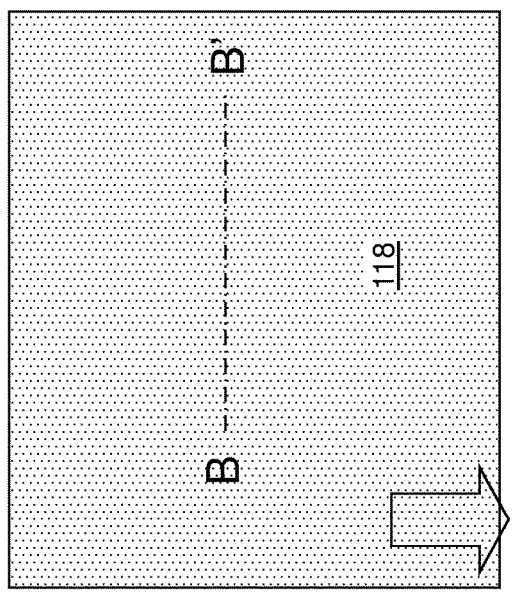
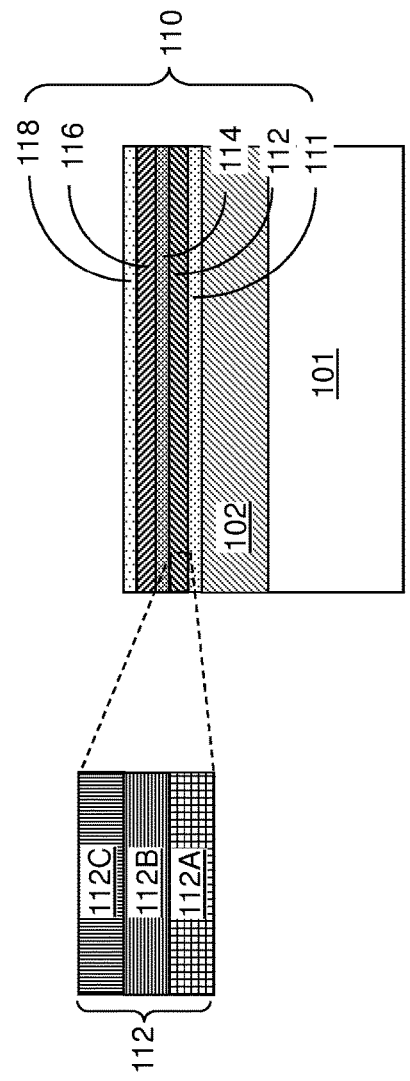
FIG. 4A
FIG. 4B

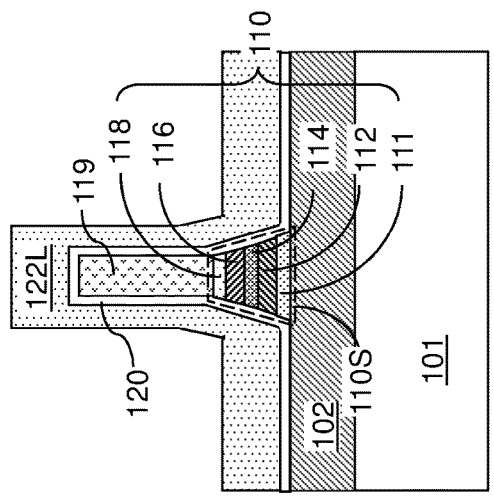
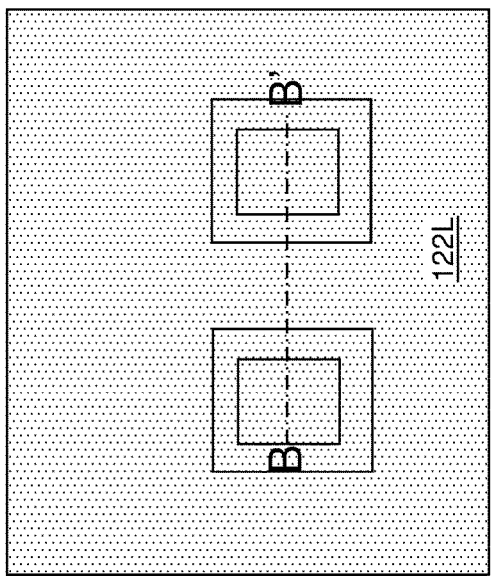
FIG. 7A
FIG. 7B

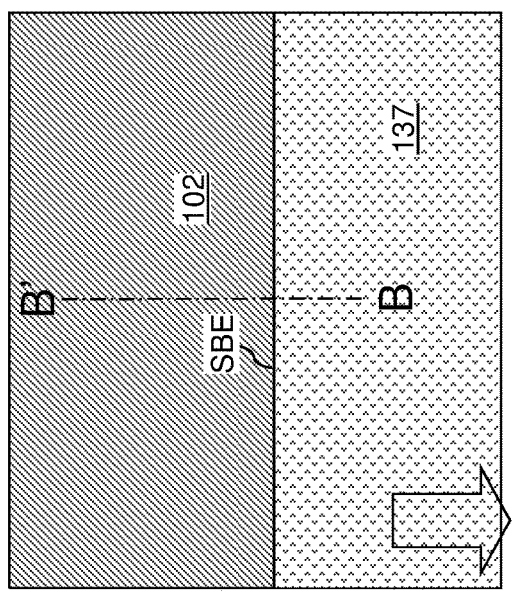
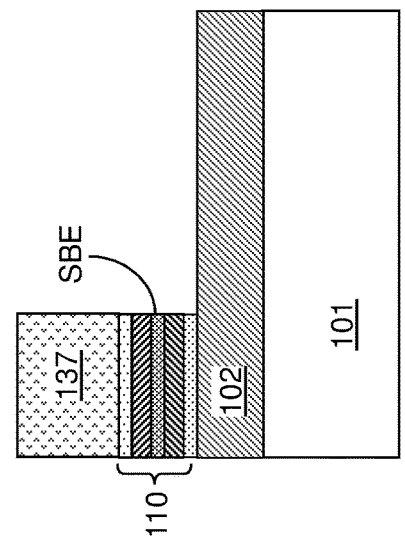
FIG. 12A
FIG. 12B

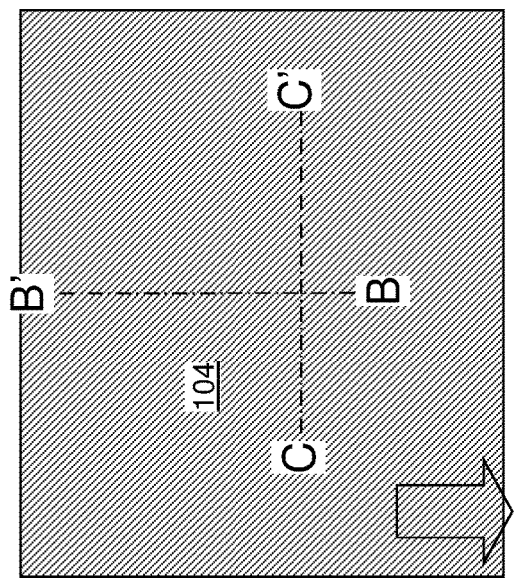
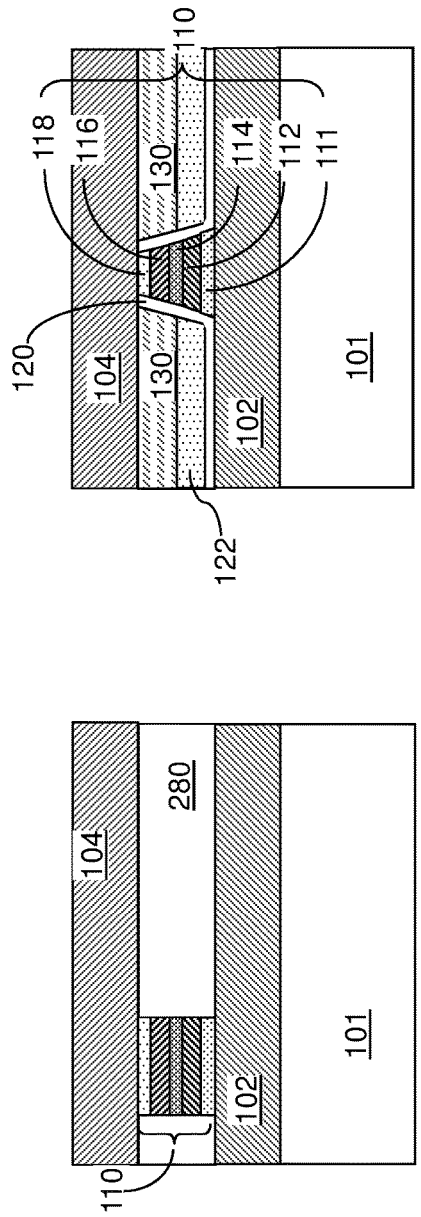
FIG. 14A
FIG. 14B
FIG. 14C

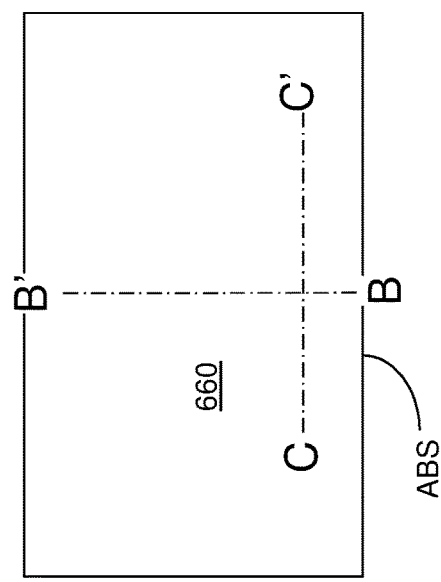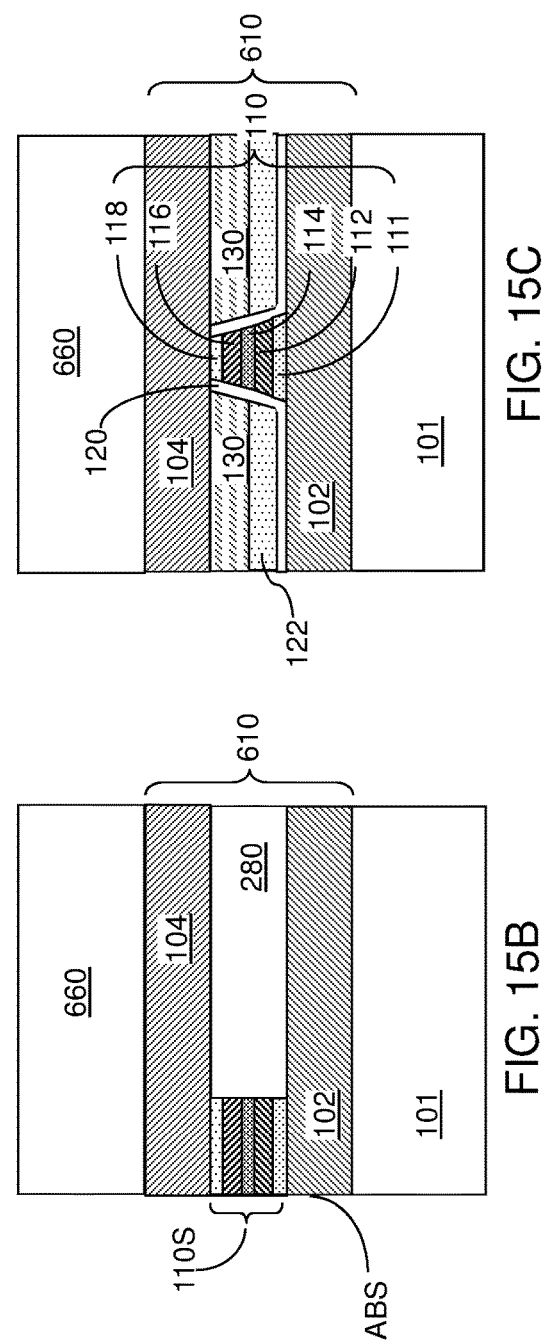

US 10,354,681 B1

TUNNEL MAGNETORESISTANCE READ HEAD INCLUDING SIDE SHIELDS CONTAINING NANOCRYSTALLINE FERROMAGNETIC PARTICLES

FIELD

The present disclosure relates generally to the field of magnetic recording devices, and particularly to a tunnel magnetoresistance reading head including side shields containing nanocrystalline ferromagnetic particles embedded within a non-magnetic dielectric matrix material and methods of manufacturing the same.

BACKGROUND

Magnetic heads are employed to operate hard disk drives. A magnetic head can include a reading head and a recording (i.e., writing) head. General structures and method of manufacture for prior art magnetic heads are disclosed, for example, in U.S. Patent Application Publication Nos. 2004/0097173 A1; 2007/0230063 A1; 2011/0294398 A1; and 2015/0260757 A1 and U.S. Pat. Nos. 8,291,743 B1; 8,361,541 B1; 8,443,510 B1; 8,717,709 B1; 8,735,565 B2; 8,964,333 B1; 9,153,261 B1; 9,321,146 B2; and 9,390,733 B2 the entire contents of which are incorporated herein and in U.S. Pat. No. 8,375,565 B2.

SUMMARY

According to an aspect of the present disclosure, a tunnel magnetoresistance (TMR) read head comprises a first magnetic shield, a read sensor stripe located over the first magnetic shield, the read sensor stripe comprising a sensor layer stack comprising a pinned layer stack, a non-magnetic electrically insulating barrier layer, and a ferromagnetic free layer, a second magnetic shield located over the sensor layer stack, an electrical isolation dielectric layer located on sidewalls of the read sensor stripe, and a pair of side shields located on the electrical isolation dielectric layer between the first magnetic shield and the second magnetic shield, and comprising nanocrystalline ferromagnetic particles embedded in a non-magnetic dielectric material matrix.

According to another aspect of the present disclosure, a method of forming a tunnel magnetoresistance (TMR) read head comprises forming a sensor layer stack including a pinned layer stack, a non-magnetic electrically insulating barrier layer, and a ferromagnetic free layer over a first magnetic shield, forming a read sensor stripe by patterning the sensor layer stack, forming an electrical isolation dielectric layer over sidewalls of the read sensor stripe, forming a pair of side shields over the electrical isolation dielectric layer and on both sides of the read sensor stripe, wherein the pair of side shields comprises nanocrystalline ferromagnetic particles embedded in a non-magnetic dielectric material matrix; and forming a second magnetic shield over the sensor layer stack.

BRIEF DESCRIPTION OF THE DRAWINGS

FIG. 4A illustrates a top-down view of an exemplary structure for forming a magnetic head after formation of a sensor layer stack according to an embodiment of the present disclosure.

FIG. 4B is a vertical cross-sectional view of a sensor region of the exemplary structure along the plane B-B' of FIG. 4A.

FIG. 7A illustrates a top-down view of the exemplary structure after formation of a nonmagnetic spacer material layer according to an embodiment of the present disclosure.

FIG. 7B is a vertical cross-sectional view of the sensor region of the exemplary structure along the plane B-B' of FIG. 7A.

FIG. 12A illustrates a top-down view of the exemplary structure after patterning a sensor backside edge according to an embodiment of the present disclosure.

FIG. 12B is a vertical cross-sectional view of the sensor region of the exemplary structure along the plane B-B' of FIG. 12A.

FIG. 14A illustrates a top-down view of the exemplary structure after formation of a second magnetic shield according to an embodiment of the present disclosure.

FIG. 14B is a vertical cross-sectional view of the sensor region of the exemplary structure along the plane B-B' of FIG. 14A.

FIG. 14C is a vertical cross-sectional view of the sensor region of the exemplary structure along the plane C-C' of FIG. 14A.

FIG. 15A illustrates a top-down view of the exemplary structure after performing a lapping process to form an air bearing surface according to an embodiment of the present disclosure.

FIG. 15B is a vertical cross-sectional view of the sensor region of the exemplary structure along the plane B-B' of FIG. 15A.

FIG. 15C is a vertical cross-sectional view of the sensor region of the exemplary structure along the plane C-C' of FIG. 15A.

DETAILED DESCRIPTION

Figure 1:
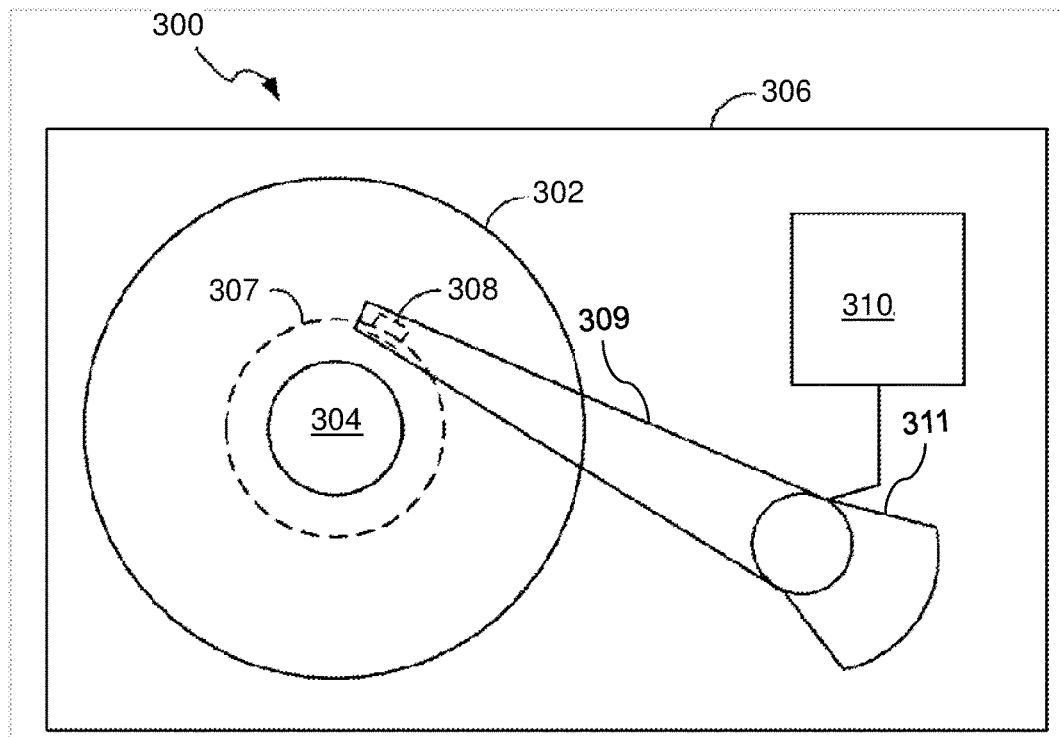
FIG. 1 is a top schematic view of a disk drive including a slider including a tunnel magnetoresistance (TMR) read head of an embodiment of the present disclosure.

Embodiments of the present disclosure are directed to a tunnel magnetoresistance reading head including side shields containing nanocrystalline ferromagnetic particles embedded within a non-magnetic dielectric matrix material and methods of manufacturing the same, the various aspects of which are described below.

The drawings are not drawn to scale. Multiple instances of an element may be duplicated where a single instance of the element is illustrated, unless absence of duplication of elements is expressly described or clearly indicated otherwise. Ordinals such as "first," "second," and "third" are employed merely to identify similar elements, and different ordinals may be employed across the specification and the claims of the instant disclosure. The same reference numerals refer to the same element or similar element. Unless otherwise indicated, elements having the same reference numerals are presumed to have the same composition. As used herein, a first element located "on" a second element can be located on the exterior side of a surface of the second element or on the interior side of the second element. As used herein, a first element is located "directly on" a second element if there exist a physical contact between a surface of the first element and a surface of the second element.

As used herein, a "layer" refers to a material portion including a region having a thickness. A layer may extend over the entirety of an underlying or overlying structure, or may have an extent less than the extent of an underlying or overlying structure. Further, a layer may be a region of a homogeneous or inhomogeneous continuous structure that has a thickness less than the thickness of the continuous structure. For example, a layer may be located between any pair of horizontal planes between, or at, a top surface and a bottom surface of the continuous structure. A layer may extend horizontally, vertically, and/or along a tapered surface. A substrate may be a layer, may include one or more layers therein, or may have one or more layer thereupon, thereabove, and/or therebelow.

A tunnel magnetoresistance (TMR) read head refers to a read head that employs spin-dependent transport and electron tunnel properties of a sensor layer stack between a first magnetic shield and a second magnetic shield that function as two electrodes. The sensor layer stack is patterned into a read sensor stripe, and a pair of side shields is provided on both sides of the read sensor stripe. The electrical current flows perpendicular to the planes of the interfaces between layers within the sensor layer stack, and hence, a TMR read head operates in a current perpendicular to plane (CPP) mode. To prevent electrical shorts between the sensor layer stack and the pair of side shields, an electrical isolation dielectric layer is provided between the pair of side shields and the sensor layer stack.

A measure of performance of a TMR read head is sensitivity to alignment to a track within a magnetic medium. In order to detect the encoded data within a target track without picking up data from neighboring tracks, the sensitivity of a TMR read head needs to decrease outside the width of a target track on a magnetic medium. The response of a magnetic read head sensor due to the magnetic field generated from a narrow track on a recording medium decreases as a function of the lateral distance (along the direction perpendicular to the track direction) of the magnetic read head sensor from a given bit stored in the track. A normalized magnetic field strength detected by the sensor from a bit in the narrow track as a function of a transverse distance (along the direction perpendicular to the track direction) of the sensor from the center of the bit has a maximum of 1.0 when the transverse distance is zero, and generally decreases with undershoots with an increase in the transverse distance. As a magnetic read head sensor moves perpendicular to the track direction, the normalized magnetic field strength detected by the sensor has a value of 0.5 at two positions, one on one side of the track and another on the other side of the track. The lateral separation distance at which the normalized magnetic field strength detected by the sensor is 0.50 is known as "MT50" in the art. Further explanation of MT50 is provided, for example, in U.S. Patent Application Publication No. 2011/0051294.

A TMR read head includes a pinned layer and a free layer. The width of the free layer along the direction perpendicular to the track direction is referred to as a free layer track width (FLTW). Generally, MT50 of a TMR read head is greater than the free layer track width FTLW. The less the difference between MT50 and FTLW, the more immune a magnetic read head sensor is against interference from adjacent tracks. State of the art design employing a combination of NiFe and CoFe side shields has demonstrated a difference between MT50 and FLTW of 6.5 nm. Further reduction in the difference between MT50 and FLTW below 6.5 nm is desired to provide greater interference immunity and a higher signal-to-noise ratio for reading with a TMR read head.

Figure 2:
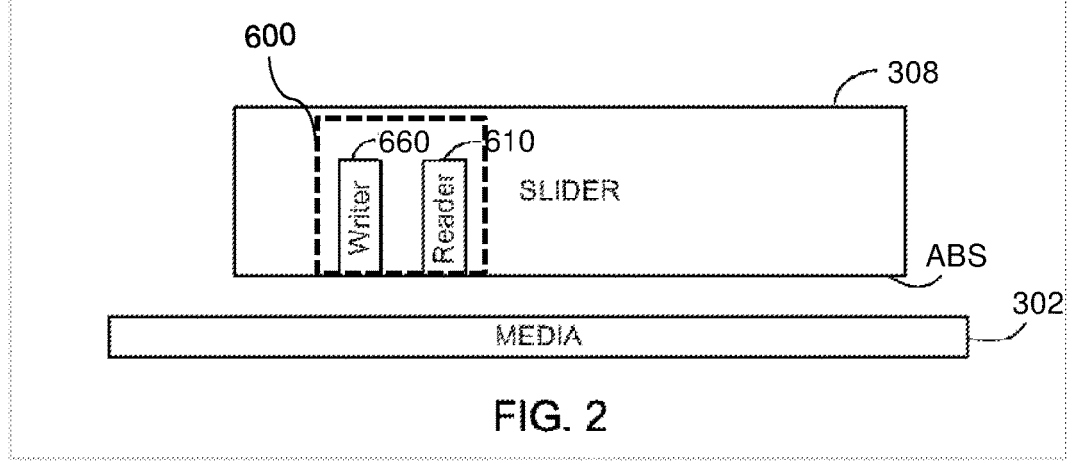
FIG. 2 is a side schematic view of the disk drive of FIG. 1.

FIG. 1 is a top schematic view of a hard disk drive 300 including a slider 308 with a tunnel magnetoresistance (TMR) read head of an embodiment of the present disclosure. FIG. 2 is a side schematic view of the slider 308 of FIG. 1 and illustrates the magnetic head 600 of the embodiments of the present disclosure. The disk drive 300 may include one or more of the disks/media 302 configured to store data. The disks/media 302 reside on a spindle assembly 304 that is mounted to a drive housing 306. Data may be stored along tracks 307 in the magnetic recording layer of disk 302. The reading and writing of data is accomplished with the magnetic head 600 that incorporates both the TMR read head 610 and a recording head 660 (i.e., a writing head). The slider 308 is part of a head-gimbal assembly (HGA) supported by one end of an actuator arm 309. The opposite end of the actuator arm 309 is connected to a head stack assembly (HSA) which may include a carriage and a voice coil motor 311. The writing head 660 is used to alter the properties of the magnetic recording layer of disk 302 and thereby write information thereto. The TMR read head 610 is used to read information stored on the magnetic recording layer of the disk 302.

The TMR read head 610 and the writing head 660 are disposed along an air bearing surface ABS of the slider 308. The ABS is the bottom surface of the slider 308, which is the slider surface that is the most proximate to the media 302. The separation distance between the ABS and the media 302 is self-limiting through the air flow between the ABS and the TMR read head 610 and/or the writing head 660. In operation, a spindle motor (not shown) rotates the spindle assembly 304, and thereby rotates the disk 302 to position the magnetic head 600 containing the TMR read head 610 and the writing head 660 at a particular location along a desired disk track 307. The position of the TMR read head 610 and/or the writing head 660 relative to disk 302 may be controlled by a position control circuitry 310 which controls the HSA to move the actuator arm 309.

Figure 3:
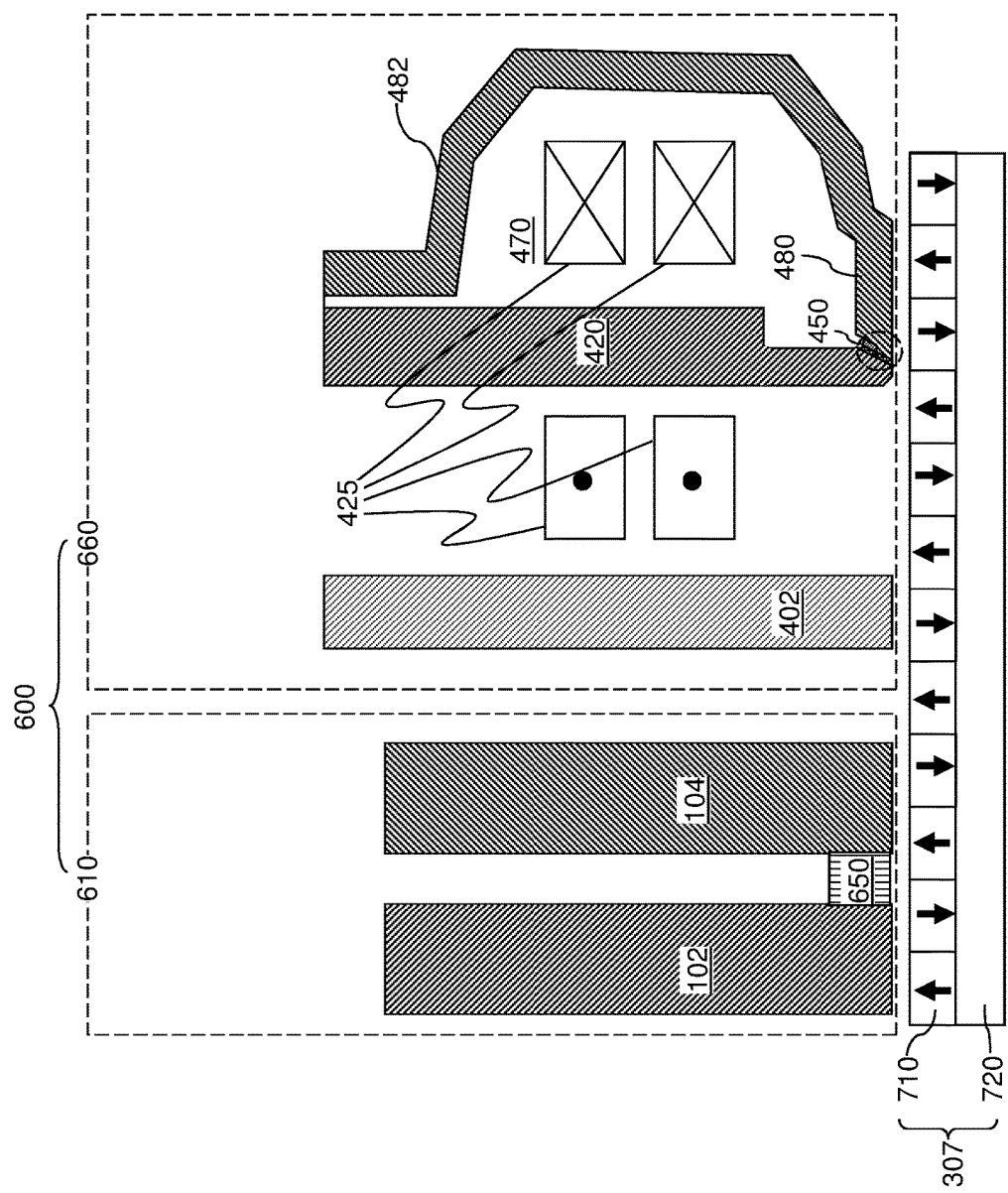
FIG. 3 is an in-track vertical cross-sectional view of an exemplary magnetic head incorporating the TMR read head of the present disclosure.

Referring to FIG. 3, an in-track vertical cross-sectional view of an exemplary magnetic head 600 of an embodiment the present disclosure is illustrated. The magnetic head 600 is positioned over a recording track 307 on a disc media 302 comprising a magnetic recording layer 710 and a soft magnetic underlayer 720. The magnetic head 600 comprises, from the leading side of the head, a TMR read head 610 and a recording (i.e., writing) head 660. The reading head comprises a lower reading shield 102, a read sensor 650 (i.e., a reading element), and an upper reading shield 104. The read sensor 650 can include a layer stack that includes a tunnel magnetoresistance (TMR) device of the embodiments of the present disclosure. The recording head 660 can comprise an optional auxiliary pole 402, a magnetic coil 425 that is wound around a main pole 420, a record element 450, and a trailing shield 480 which may be integrated with an upper pole 482. The record element 450 is formed between the main pole 420 and the trailing shield 480. An insulating material portion 470 is provided around the magnetic coil 425 between the main pole 420 and the trailing shield 480.

Referring to FIGS. 4A and 4B, an exemplary structure for forming a TMR read head of the present disclosure is illustrated. The exemplary structure includes a substrate 101, which can be, for example, an aluminum titanium carbide substrate. A first magnetic shield 102 is formed within a sensor region of the exemplary structure. The first magnetic shield 102 includes a soft magnetic material, and may have a thickness in a range from 200 nm to 2,000 nm, although lesser and great thicknesses can also be employed. The first magnetic shield 102 can be subsequently patterned to provide the lower reading shield 102 of a magnetic head 600 in a finished product. In one embodiment, the first magnetic shield 102 can comprise, or consist essentially of, NiFe, NiCo, CoFe, NiFeCo, CoB, CoFeB, and/or combinations thereof.

A sensor layer stack 110 can be deposited over the first magnetic shield 102 in the sensor region by sequential deposition of material layers. The sensor layer stack 110 can include a pinned layer stack 112, a non-magnetic electrically insulating barrier layer 114, and a ferromagnetic free layer 116. In one embodiment, the sensor layer stack 110 can further include a backside electrically conductive (e.g., seed) layer 111 below the pinned layer stack 112, and a front side non-magnetic electrically conductive (e.g., cap) layer 118 above the ferromagnetic free layer 116.

The backside electrically conductive layer 111 can include a layer stack that facilitates growth of subsequently layers. For example, the backside electrically conductive layer 111 can include materials such as a graded nickel iron alloy and/or ruthenium, and can have a thickness in a range from 6 nm to 24 nm, although lesser and greater thicknesses can also be employed.

The pinned layer stack 112 can include an antiferromagnetic pinning layer 112A, a first ferromagnetic pinned layer 112B, and an optional second ferromagnetic pinned layer 112C. The anti-ferromagnetic pinning layer 112A can comprise, or consist essentially of, IrMn, IrMnCr, and/or combinations thereof. Each of the first pinned layer 112B and the second pinned layer 112C can comprise CoFe, CoB, CoFeB, and/or combinations thereof. An intervening non-magnetic layer (not shown) such as a ruthenium layer may be provided between the first pinned layer 112B and the second pinned layer 112C. The pinned layer stack 112 provides a fixed magnetization direction. The thickness of the pinned layer stack 112 can be in a range from 7 nm to 25 nm, although lesser and greater thicknesses can also be employed.

The non-magnetic electrically insulating barrier layer 114 can comprise a magnesium oxide or aluminum oxide layer, or any functional equivalent thereof.

The ferromagnetic free layer 116 can comprise a layer stack including various materials such as NiFe, NiCo, CoFe, Fe, NiFeCo, CoB, CoFeB, and/or combinations thereof. The thickness of the ferromagnetic free layer 116 can be in a range from 4 nm to 12 nm, although lesser and greater thicknesses can also be employed.

The front side non-magnetic electrically conductive layer 118 can comprise, or consist essentially of, Ru, Ta, Ti, and/or combinations thereof. The thickness of the front side non-magnetic electrically conductive layer 118 can be in a range from 4 nm to 16 nm, although lesser and greater thicknesses can also be employed.

The sensor layer stack 110 can be deposited by a series of layer deposition processes such as chemical vapor deposition, atomic layer deposition, and/or physical vapor deposition. In other embodiments, other suitable materials known in the art can be used for any layer within the sensor layer stack 110.

Figure 5A:
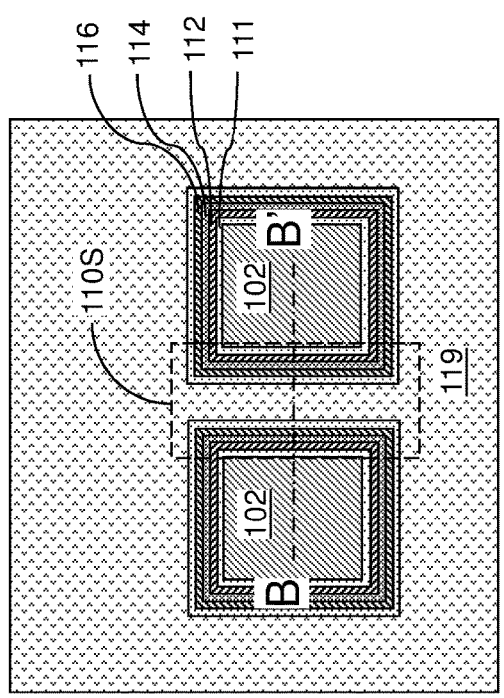
FIG. 5A illustrates a top-down view of the exemplary structure after formation of a read sensor stripe by patterning the sensor layer stack according to an embodiment of the present disclosure.
Figure 5B:
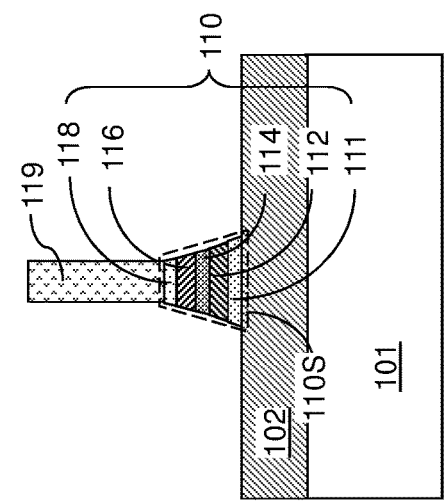
FIG. 5B is a vertical cross-sectional view of the sensor region of the exemplary structure along the plane B-B' of FIG. 5A.

Referring to FIGS. 5A and 5B, the sensor layer stack 110 is patterned to provide a read sensor stripe 110S between a pair of recess cavities. The read sensor stripe 110S can have a substantially uniform vertical cross-sectional view along planes parallel to the air bearing surface to be subsequently formed, which are parallel to the vertical cross-sectional plane of FIG. 5B. The read sensor stripe 110S can have a tapered profile such that upper layers within the patterned sensor layer stack 110 have lesser areas than lower layers within the patterned sensor layer stack 110.

The patterning of the sensor layer stack 110 can be performed, for example, by applying a photoresist layer 119 over the blanket (unpatterned) sensor layer stack 110, lithographically patterning the photoresist layer 119 to form a pair of openings separated by a rectangular area having parallel edges that are perpendicular to the air bearing surface to be subsequently formed, and performing a continuous ion milling process on the layers of the sensor layer stack 110 to provide a pair of openings through the sensor layer stack 110 with tapered sidewalls. The photoresist layer 119 can protect covered regions of the sensor layer stack 110 during the continuous ion milling and subsequent processes. The taper angle on the sidewalls of the patterned sensor layer stack 110 provides continuous reduction of the width of the layers in the sensor layer stack 110 within the read sensor stripe 110S.

Figure 6A:
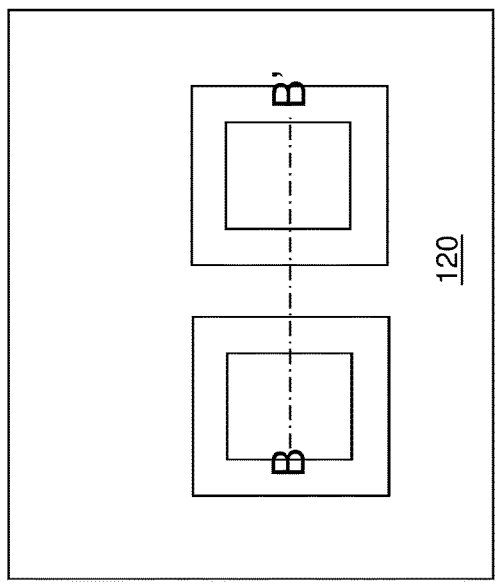
FIG. 6A illustrates a top-down view of the exemplary structure after formation of an electrical isolation dielectric layer according to an embodiment of the present disclosure.
Figure 6B:
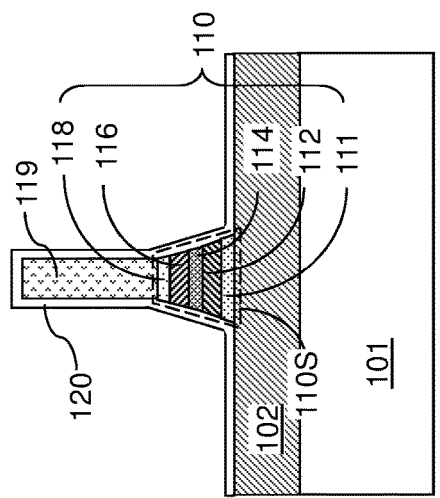
FIG. 6B is a vertical cross-sectional view of the sensor region of the exemplary structure along the plane B-B' of FIG. 6A.

Referring to FIGS. 6A and 6B, an electrical isolation dielectric layer 120 can be formed on the physically exposed top surfaces of the first magnetic shield 102 and on the sidewalls of the sensor layer stack 110, which include the sidewalls of the read sensor stripe 110S. The electrical isolation dielectric layer 120 includes a dielectric material that provides electrical isolation, and may be formed by a conformal deposition process. For example, the electrical isolation dielectric layer 120 can comprise, or consist essentially of, aluminum oxide, magnesium oxide, silicon nitride, silicon oxide, and/or combinations or stacks thereof.

Referring to FIGS. 7A and 7B, a nonmagnetic spacer material layer 122L can be deposited on the electrical isolation dielectric layer 120. In one embodiment, the composition of the nonmagnetic spacer material layer 122L can be selected to effectively function as a growth seed material for a matrix-particle composite layer to be subsequently formed, and to provide high angular milling selectivity. In one embodiment, the nonmagnetic spacer material layer 122L can have small grain sizes in order to provide a smooth nucleation surface for growth of the matrix-particle composite layer to be subsequently formed. Further, the nonmagnetic spacer material layer 122L can include a material that provides favorable growth texture for the a matrix-particle composite layer. As to the angular milling selectivity property, in one aspect, the material(s) for the nonmagnetic spacer material layer 122L can have a suitable angular etch selectivity to preferentially enable removal (i.e., cleaning) of the material(s) of the nonmagnetic spacer material layer 122L along the angled sides of the sensor layer stack 110. In one embodiment, the nonmagnetic spacer material layer 122L can comprise, or consist essentially of, NiFeCr, NiCr, Ta, Ru, Cr, oxides thereof, and/or combinations thereof.

Figure 8A:
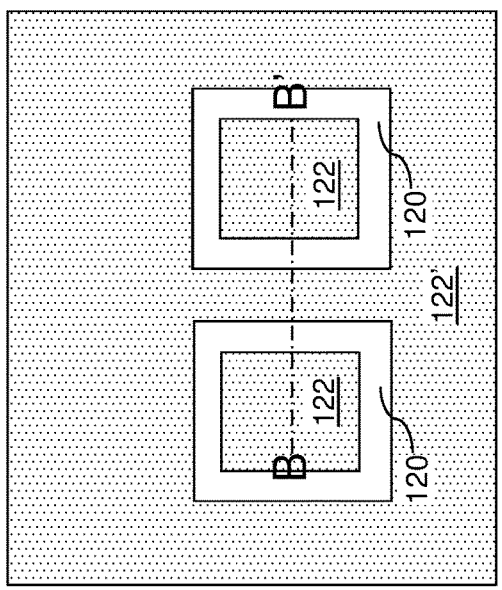
FIG. 8A illustrates a top-down view of the exemplary structure after formation of a pair of nonmagnetic spacers according to an embodiment of the present disclosure.
Figure 8B:
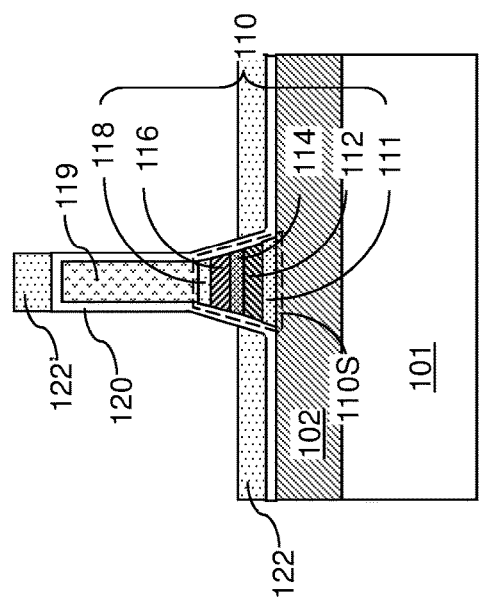
FIG. 8B is a vertical cross-sectional view of the sensor region of the exemplary structure along the plane B-B' of FIG. 8A.

Referring to FIGS. 8A and 8B, an angled milling process can be performed to remove vertical and tapered portions of the nonmagnetic spacer material layer 122L. Specifically, the vertical and tapered portions of the nonmagnetic spacer material layer 122L can be removed along the angled sides of the sensor layer stack 110. In one embodiment, the angled milling process removes portions of the nonmagnetic spacer material layer 122L along the angled sides of the sensor layer stack 110 located at and above the ferromagnetic free layer 116. Each remaining portion of nonmagnetic spacer material layer 122L underlying the horizontal plane including the bottom surface of the ferromagnetic free layer 116 constitutes a nonmagnetic spacer 122. A pair of nonmagnetic spacers 122 is formed on the sidewalls of the read sensor stripe 110S over planar (horizontal) portions of the electrical isolation dielectric layer 120 that contact the first magnetic shield 102. Each nonmagnetic spacer 122 has a respective top surface below the horizontal plane including the bottom surface of the ferromagnetic free layer 116. The pair of nonmagnetic spacers 122 is laterally spaced from the read sensor stripe 110S by tapered portions of the electrical isolation dielectric layer 120. A remaining portion of the nonmagnetic spacer material layer 122L overlying the photoresist layer 119 constitutes a nonmagnetic material layer 122'.

Figure 9A:
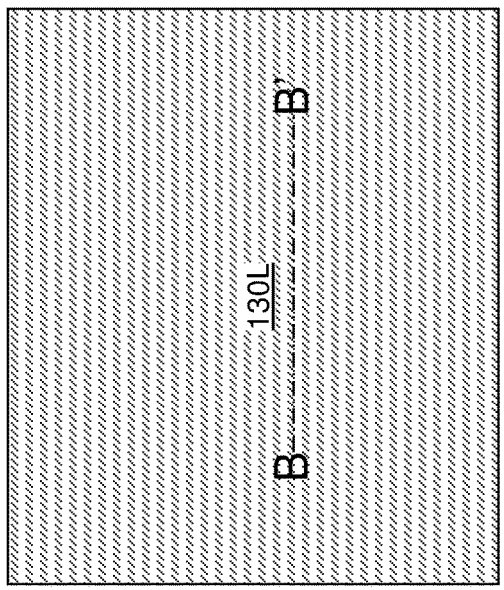
FIG. 9A illustrates a top-down view of the exemplary structure after formation of a matrix-particle composite layer including nanocrystalline ferromagnetic particles embedded in a non-magnetic dielectric material matrix according to an embodiment of the present disclosure.
Figure 9B:
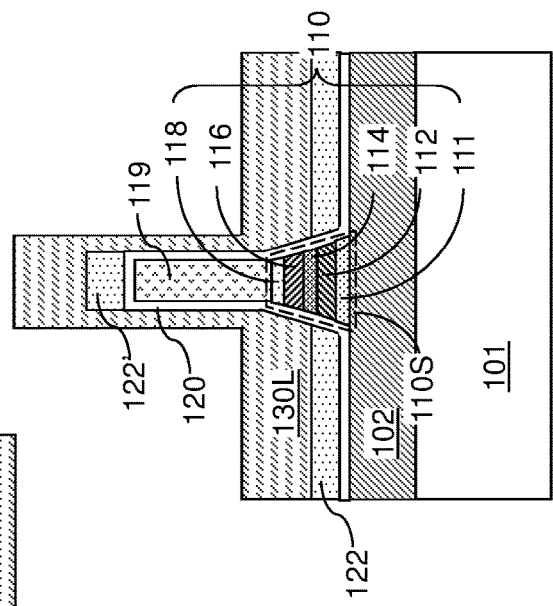
FIG. 9B is a vertical cross-sectional view of the sensor region of the exemplary structure along the plane B-B' of FIG. 9A.

Referring to FIGS. 9A and 9B, a matrix-particle composite layer 130L is deposited over the pair of nonmagnetic spacers 122, the electrical isolation dielectric layer 120, and the nonmagnetic material layer 122'. The matrix-particle composite layer 130L includes nanocrystalline ferromagnetic particles embedded in a non-magnetic dielectric material matrix. According to an aspect of the present disclosure, a combination of the nanocrystalline ferromagnetic particles and the non-magnetic dielectric material matrix can be formed by a reactive ion beam deposition process (i.e., reactive ion beam sputtering) in which a target material including an alloy of hafnium and at least one magnetic element is sputtered over the electrical isolation dielectric layer 120 using an argon ion beam in an oxygen-containing ambient. The at least one magnetic element can be selected from iron, cobalt, and a combination of iron and cobalt. Correspondingly, the nanocrystalline ferromagnetic particles comprise a material selected from iron particles, cobalt particles, and particles of an alloy of iron and cobalt. Alternatively, a physical vapor deposition (PVD) process, such as reactive sputtering may be used instead of the reactive ion beam deposition process to form the matrix-particle composite layer 130L.

The oxygen partial pressure during the reactive ion beam deposition process can be maintained such that a predominant portion of the at least one magnetic element remains unoxidized, and is incorporated into the nanocrystalline ferromagnetic particles. For example, the oxygen partial pressure during the reactive ion beam deposition process can be less than 2 mTorr, and may be in a range from 0.01 mTorr to 0.5 mTorr.

In one embodiment, the composition of the oxygen-containing ambient can be achieved by flowing a gas mixture including oxygen and argon, such as a mixture containing at least 10% oxygen, such as about 10% $O_2$ and 90% Ar into the process chamber. Alternatively, the oxygen-containing ambient can be provided by flowing a mixture of $O_2$ and Ar having a different compositional ratio, or pure $O_2$ without Ar into the process chamber. For example, the oxygen containing ambient may include an oxygen gas flow rate of 1 to 3 standard cubic centimeters per minute (sccm) and an argon flow rate of 10 to 30 sccm, for an oxygen-to-argon flow ratio of 3:10 to 1:30. The purpose of the oxygen and argon gas mixture is to facilitate the control of low $O_2$ partial pressures, to suppress oxidation of at least one magnetic element (e.g., iron and/or cobalt), and control the average grain size of the nanocrystalline ferromagnetic particles.

The hafnium atoms from the target are easily oxidized in the oxygen-containing ambient to form the non-magnetic dielectric material matrix. In one embodiment, more than 90% (which can be more than 95% and/or more than 98% and/or more than 99%) of all hafnium atoms in the non-magnetic dielectric matrix are in an oxidized state (i.e., providing a hafnium oxide matrix), and more than 98% (which can be more than 99% and/or more than 99.5%) of all iron and/or cobalt atoms in the nanocrystalline ferromagnetic particles are in an unoxidized state (i.e., in the metal iron, cobalt or iron-cobalt alloy particle form dispersed in the matrix).

Alternatively, the nonmagnetic dielectric material matrix of the matrix-particle composite layer 130L can include nonmagnetic matrix material comprising (or consisting essentially of) a material selected from aluminum oxide, silicon oxide, zirconium oxide, titanium oxide, and tantalum oxide in addition to or instead of hafnium oxide. In this case, the non-magnetic metal atoms (i.e., the aluminum atoms, silicon atoms, zirconium atoms, titanium atoms, and/or tantalum atoms from the target) are easily oxidized in the oxygen-containing ambient to form the non-magnetic dielectric material matrix. In one embodiment, more than 90% (which can be more than 95% and/or more than 98% and/or more than 99%) of all non-magnetic metal atoms in the nonmagnetic dielectric matrix are in an oxidized state (i.e., providing a silicon oxide or metal matrix), and more than 98% (which can be more than 99% and/or more than 99.5%) of all iron and/or cobalt atoms in the nanocrystalline ferromagnetic particles are in an unoxidized state (i.e., in the metal iron, cobalt or iron-cobalt alloy particle form dispersed in the matrix).

The nanocrystalline ferromagnetic particles are metallic, and provide electrical conduction upon contact among one another through percolation. The nonmagnetic dielectric matrix is electrically insulating. The electrical conductivity of the matrix-particle composite layer 130L is determined by percolation of the nanocrystalline ferromagnetic particles within the matrix-particle composite layer 130L, which can be controlled by the average size of the nanocrystalline ferromagnetic particles and the volume ratio of the nanocrystalline ferromagnetic particles to the nonmagnetic dielectric matrix. The oxygen partial pressure is the process parameter that affects the average size of the nanocrystalline ferromagnetic particles. The volume ratio of the nanocrystalline ferromagnetic particles to the nonmagnetic dielectric matrix is determined by the material composition of the target material.

The target material can consist essentially of the at least one magnetic element and hafnium. In one embodiment, the atomic ratio of the at least one magnetic element (e.g., Fe, Co, or Co and Fe) to hafnium atoms within target material can be in a range from 1 to 9, such as a range from 2 to 8 and/or a range from 4 to 5. The nanocrystalline ferromagnetic particles have an average volume in a range from 14 cubic nanometers to 523 cubic nanometers, which correspond to an average lateral dimension (e.g., width or diameter) of 10 nm or less, such as a range from 3 nm to 10 nm. The volume of 14 cubic nanometers is equivalent to the volume of a sphere having a diameter of approximately 3 nm, and the volume of 523 cubic nanometers is equivalent to the volume of a sphere having a diameter of approximately 10 nm. The shapes of the nanocrystalline ferromagnetic particles may be roughly spherical.

In one embodiment, the at least one magnetic element can consist essentially of iron, cobalt, or a combination of iron and cobalt. In one embodiment, the at least one magnetic element can be iron. In another embodiment, the at least one magnetic element can be cobalt. In yet another embodiment, the at least one magnetic element can include iron and cobalt. In this case, the atomic ratio of iron atoms to cobalt atoms within the target material can be in a range from 1/9 to 9, such as from 1/4 to 4, from 1/3 to 3, from 1/2 to 2, and/or from 2/3 to 3/2. Correspondingly, the atomic ratio of iron atoms to cobalt atoms within the nanocrystalline ferromagnetic particles can be in a range from 1/9 to 9, such as from 1/4 to 4, from 1/3 to 3, from 1/2 to 2, and/or from 2/3 to 3/2.

Without wishing to be bound by a particular theory, it is believed that formation of the nanocrystalline ferromagnetic particles embedded in the non-magnetic dielectric material matrix as a side shield in lieu of a continuous ferromagnetic material side shield has the effect of reducing the magnetic flux density (i.e., the magnetic field strength) generated from the magnetic material. For example, the matrix-particle composite layer 130L according to an embodiment of the present disclosure can provide a magnetic flux density in a range from 0.7 T to 1.3 T instead of a magnetic flux density of about 2 T that a continuous ferromagnetic material sheet including iron, cobalt, or a cobalt-iron alloy can generate. Thus, the matrix-particle composite layer 130L of the present disclosure can weaken the exchange interaction in the material of the matrix-particle composite layer 130L to improve the side shields and reduce MT50.

Figure 9C:
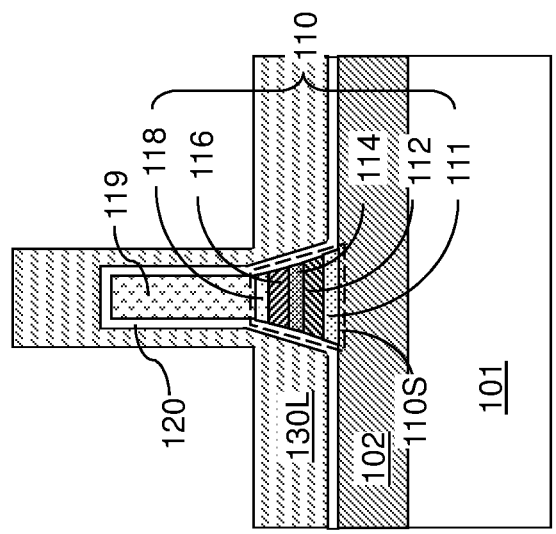
FIG. 9C is a vertical cross-sectional view of an alternative embodiment of the sensor region of the exemplary structure of FIGS. 9A and 9B.

FIG. 9C illustrates an alternative embodiment of the structure of FIGS. 9A and 9B, in which the processing steps of FIGS. 7A, 7B, 8A, and 8B are omitted. In other words, formation of the nonmagnetic spacer material layer 122L can be omitted, and correspondingly, the nonmagnetic spacers 122 and the nonmagnetic material layer 122' are not present.

Modifications to the exemplary structures of FIGS. 9A-9C may be optionally made as needed. For example, the above described tapered milling in FIGS. 5A and 5B may be a partial milling down to roughly the level of the nonmagnetic electrically insulating barrier layer 114, followed by formation of the electrical isolation dielectric layer 120 and the matrix-particle composite layer 130L. In this case the matrix-particle composite layer 130L would be relatively thin, without the need for an intervening nonmagnetic layer 122.

Figure 10A:
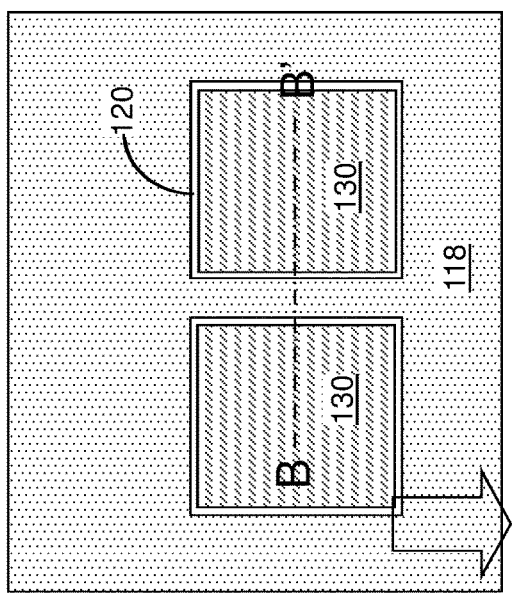
FIG. 10A illustrates a top-down view of the exemplary structure after formation of a pair of side shields according to an embodiment of the present disclosure.
Figure 10B:
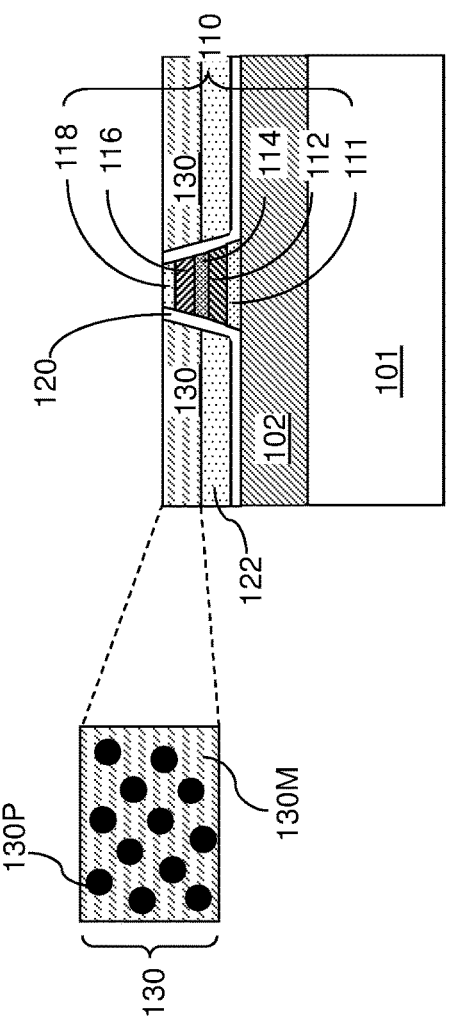
FIG. 10B is a vertical cross-sectional view of the sensor region of the exemplary structure along the plane B-B' of FIG. 10A.

Referring to FIGS. 10A and 10B, an angled milling process can be performed to selectively remove vertical and tapered portions of the matrix-particle composite layer 130L. Specifically, the vertical and tapered portions of the matrix-particle composite layer 130L can be removed along the angled sides of the sensor layer stack 110. In one embodiment, the angled milling process removes portions of the matrix-particle composite layer 130L along the angled sides of the sensor layer stack 110 located above the front side non-magnetic electrically conductive layer 118. Each remaining portions of matrix-particle composite layer 130L underlying filling a pair of cavities in the sensor layer stack 110 constitutes a pair of side shields 130. The pair of side shields 130 is formed on the sidewalls of the electrical isolation dielectric layer 120 over the horizontal plane including the bottom surfaces of the ferromagnetic free layer 116. The pair of side shields 130 is laterally spaced from the read sensor stripe 110S by the electrical isolation dielectric layer 120, and overlies the pair of nonmagnetic spacers 122.

Vertical portions of the electrical isolation dielectric layer 120 that overlie the pair of side shields 130 can be removed by the angled milling process. The photoresist layer 119, the nonmagnetic material layer 122', and a remaining portion of the matrix-particle composite layer 130L overlying the photoresist layer 119 can be subsequently removed, for example, by a lift-off process that lifts off the photoresist layer 119. For example, a wet etch process employing a solvent that dissolves, and/or lifts off, the photoresist layer 119 may be employed.

The pair of side shields 130 is formed on the electrical isolation dielectric layer 120 on both sides of the read sensor stripe 110S. The pair of side shields 130 comprises nanocrystalline ferromagnetic particles embedded in a non-magnetic dielectric material matrix. The nanocrystalline ferromagnetic particles have an average volume in a range from 14 cubic nanometers to 523 cubic nanometers.

An anneal process can be optionally performed, which repairs crystallographic imperfections in the nanocrystalline ferromagnetic particles and reduces stress in the side shields. The temperature of the anneal process can be in a range from 180 degrees to 230 degrees, and the duration of the anneal process can be in a range from 30 minutes to 2 hours. Without wishing to be bound by a particular theory, it is believed that the nanocrystalline ferromagnetic particles 130P have a body centered cubic (bcc) lattice structure, while the hafnium oxide matrix 130M is amorphous, as shown in the inset in FIG. 10B. The nanocrystalline ferromagnetic particles can be magnetically uniaxially anisotropic.

The pair of side shields 130 is spaced from the first magnetic shield 102 by a planar (horizontal) portion of the electrical isolation dielectric layer 120 having a planar surface that is parallel to an interface between the first magnetic shield 102 and the sensor layer stack 110. The pair of side shields 130 can be formed directly on the pair of nonmagnetic spacers 122. Further, the pair of side shields 130 can be formed directly on a respective tapered sidewall of the electrical isolation dielectric layer 120. A top surface of the front side non-magnetic electrically conductive layer 118 can be physically exposed, which may be coplanar with, raised above, or recessed below, top surfaces of the pair of side shields 130.

The pair of side shields 130 provides a magnetic bias to the ferromagnetic free layer 116 along the horizontal direction, which is the cross-track direction during operation of the magnetic head 600. It is believed that the nanocrystalline ferromagnetic particles embedded in a non-magnetic dielectric material matrix in the side shield 130 provides reduced exchange coupling to provide higher track resolution during operation of the TMR read head 610.

Figure 11A:
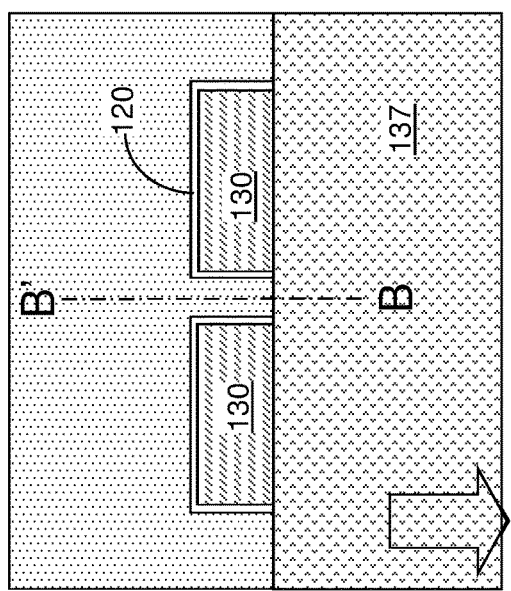
FIG. 11A illustrates a top-down view of the exemplary structure after application and patterning of a sensor-backside-pattern photoresist layer according to an embodiment of the present disclosure.
Figure 11B:
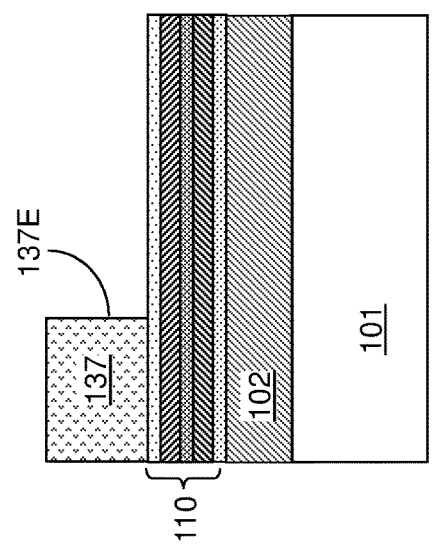
FIG. 11B is a vertical cross-sectional view of the sensor region of the exemplary structure along the plane B-B' of FIG. 11A.

Referring to FIGS. 11A and 11B, a photoresist layer 137 for patterning the backside edge of each magnetic sensor is applied and patterned over the exemplary structure. The photoresist layer 137 is applied and patterned to form an opening having a straight edge 137E that is parallel to the air bearing surface. The straight edge 137E can overlie a back side of the read sensor stripe 110S and back sides of the pair of side shields 130. As used herein, a "backside" or "back side" refers to a side that is distal from the air bearing surface to be subsequently formed, and a "front side" refers to a side that is proximal to the air bearing surface to be subsequently formed. In one embodiment, the opening in the photoresist layer 137 can have a substantially rectangular shape.

Referring to FIGS. 12A and 12B, unmasked portions of the material layers overlying the first magnetic shield 102 are patterned by transferring the pattern of the photoresist layer 137 therethrough. In one embodiment, a first ion milling process can be performed employing the photoresist layer 137 as an ion milling mask layer. A backside edge of the sensor layer stack 110 (e.g., the read sensor stripe 110S) is formed, which is herein referred to as a sensor backside edge SBE. The sensor backside edge SBE is formed at a periphery of a recess cavity that underlies the opening in the photoresist layer 137.

Figure 13A:
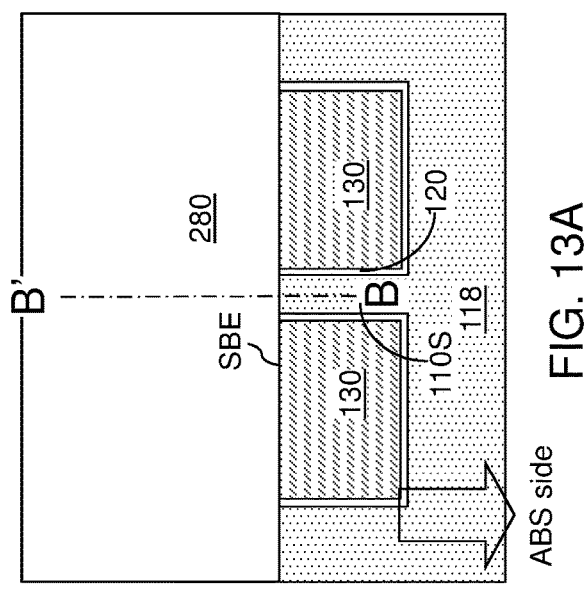
FIG. 13A illustrates a top-down view of the exemplary structure after deposition of a dielectric fill material layer according to an embodiment of the present disclosure.
Figure 13B:
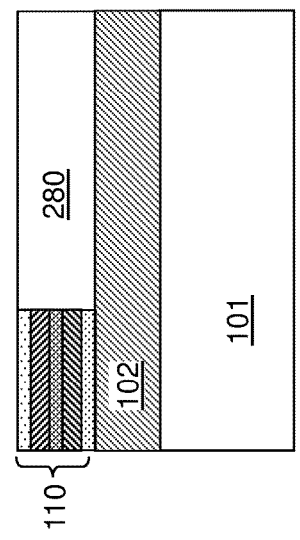
FIG. 13B is a vertical cross-sectional view of the sensor region of the exemplary structure along the plane B-B' of FIG. 13A.

Referring to FIGS. 13A-13C, a dielectric material, such as aluminum oxide, tantalum oxide, silicon oxide or silicon nitride is deposited in the recessed region and over the patterned read sensor stack 110. Excess portions of the dielectric material is removed from above the horizontal plane including the top surface of the patterned read sensor stack 110. A remaining portion of the dielectric material forms a dielectric fill layer 280 behind patterned read sensor stack 110. The dielectric fill layer 280 includes a dielectric material such as aluminum oxide, tantalum oxide, silicon oxide, silicon nitride, or combinations thereof.

Referring to FIGS. 14A-14C, a second magnetic shield 104 is then formed on the sensor layer stack 110 and the pair of side shields 130. The second magnetic shield 104 includes a soft magnetic material, and may have a thickness in a range from 200 nm to 2,000 nm, although lesser and great thicknesses can also be employed. The second magnetic shield 104 can be subsequently patterned to provide the upper reading shield 104 of a magnetic head 600 in a finished product.

Referring to FIGS. 15A-15C, the writing head 660 is then formed over the TMR read head 610. A lapping process is then performed on the exemplary structure to provide an air bearing surface (ABS).

Referring to all drawings and according to various aspects of the present disclosure, a tunnel magnetoresistance (TMR) read head 610 is provided, which comprises: a first magnetic shield 102, a read sensor stripe 110S located on the first magnetic shield 102 and comprising a sensor layer stack 110 including a pinned layer stack 112, a non-magnetic electrically insulating barrier layer 114, and a ferromagnetic free layer 116 and; a second magnetic shield 104 located over the sensor layer stack 110; an electrical isolation dielectric layer 120 located on sidewalls of the read sensor stripe 110S; and a pair of side shields 130 located on the electrical isolation dielectric layer 120 and between the first magnetic shield 102 and the second magnetic shield 104 and comprising nanocrystalline ferromagnetic particles embedded in a non-magnetic dielectric material matrix.

In one embodiment shown in the inset in FIG. 10B, the nonmagnetic dielectric matrix 130M comprises hafnium oxide. In one embodiment, the nanocrystalline ferromagnetic particles 130P comprise a material selected from iron particles, cobalt particles, and particles of an alloy of iron and cobalt. In one embodiment, the atomic ratio of iron atoms to cobalt atoms within the nanocrystalline ferromagnetic particles is in a range from 1/9 to 9. In one embodiment, the atomic ratio of metal atoms (i.e., the iron atoms and/or the cobalt atoms) in the nanocrystalline ferromagnetic particles to hafnium atoms within the pair of side shields is in a range from 1 to 9.

In one embodiment, the ferromagnetic particles 130P have a diameter of 3 nm to 10 nm and comprise body centered cubic lattice structure, and the dielectric matrix 130M comprises amorphous hafnium oxide. In one embodiment, more than 90% of all hafnium atoms in the nonmagnetic dielectric matrix are in an oxidized state; and more than 98% of all metal atoms in the nanocrystalline ferromagnetic particles are in an unoxidized state.

In one embodiment, the pair of side shields 130 is spaced from the first magnetic shield 102 by a planar portion of the electrical isolation dielectric layer 120. The planar portion has a planar surface that is parallel to an interface between the first magnetic shield 102 and the sensor layer stack 110.

In one embodiment, the pair of side shields 130 contacts a surface of the second magnetic shield 104 that is parallel to the interface between the first magnetic shield 102 and the sensor layer stack 110. In one embodiment, each of the pair of side shields 130 contacts a respective tapered sidewall of the electrical isolation dielectric layer 120; and the pair of side shields 130 is spaced from the planar portion of the electrical isolation dielectric layer 129 by a pair of nonmagnetic spacers 122.

In one embodiment, the pinned layer stack 112 can include an antiferromagnetic pinning layer 112A and at least one ferromagnetic pinned layer (112B, 112C). In one embodiment, the sensor layer stack 110 further comprises: a backside electrically conductive layer 111 contacting the first magnetic shield 102 and a front side non-magnetic electrically conductive layer 118 contacting the second magnetic shield 104. The backside electrically conductive layer 111 can comprise, or consist essentially of, at least one nonmagnetic material.

In one embodiment, illustrated in FIGS. 1 and 2, a hard disk drive 300 includes a magnetic head 600 containing the TMR read head 610, a slider 308 supporting the magnetic head 600, an actuator arm 309 supporting the slider 308, a voice coil motor 311 configured to control the actuator arm 309, and a magnetic disk 302.

The TMR read head 610 containing the low exchange CoFeHfO$_x$ material side shields 330 of the embodiments of the present disclosure can provide a smaller difference between MT50 (i.e., the lateral separation distance at which the normalized magnetic field strength detected by the sensor is 0.50, as defined above) and free layer track width (FLTW) than prior art read heads which employ bulk CoFe and NiFe side shields. For example, the prior art read heads typically exhibit MT50 that is greater than FLTW by at least 6.5 nm, while the TMR read head 610 containing the CoFeHfO$_x$ side shields 330 of the embodiments of the present disclosure exhibits MT50 that is greater than FLTW by than 6.3 nm, such as less than 6 nm, such as less than 5.75 nm. In one embodiment, the difference between an MT50 of the embodiment TMR read head 610 and the free layer track width can be in a range from about 5.2 nm to about 6.2 nm, such as 5.25 nm to 6.15 nm, including 5.25 nm to 5.75 nm.

Although the foregoing refers to particular preferred embodiments, it will be understood that the disclosure is not so limited. It will occur to those of ordinary skill in the art that various modifications may be made to the disclosed embodiments and that such modifications are intended to be within the scope of the disclosure. Where an embodiment employing a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art. All of the publications, patent applications and patents cited herein are incorporated herein by reference in their entirety.

What is claimed is:

1. A tunnel magnetoresistance (TMR) read head comprising:
   a first magnetic shield;
   a read sensor stripe located over the first magnetic shield, the read sensor stripe comprising a sensor layer stack comprising a pinned layer stack, a non-magnetic electrically insulating barrier layer, and a ferromagnetic free layer;
   a second magnetic shield located over the sensor layer stack;
   an electrical isolation dielectric layer located on sidewalls of the read sensor stripe; and
   a pair of side shields located on the electrical isolation dielectric layer between the first magnetic shield and the second magnetic shield, and comprising nanocrystalline ferromagnetic particles embedded in a non-magnetic dielectric material matrix.

2. The TMR read head of claim 1, wherein the non-magnetic dielectric material matrix comprises hafnium oxide and the nanocrystalline ferromagnetic particles comprise a material selected from iron particles, cobalt particles, and particles of an alloy of iron and cobalt.

3. The TMR read head of claim 2, wherein the nanocrystalline ferromagnetic particles comprise the alloy of iron and cobalt having an atomic ratio of iron atoms to cobalt atoms in a range from 1/9 to 9.

4. The TMR read head of claim 2, wherein the nanocrystalline ferromagnetic particles have a diameter of 3 nm to 10 nm and comprise body centered cubic lattice structure, and wherein the non-magnetic dielectric material matrix comprises amorphous hafnium oxide.

5. The TMR read head of claim 2, wherein an atomic ratio of metal atoms in the nanocrystalline ferromagnetic particles to hafnium atoms within the pair of side shields is in a range from 1 to 9.

6. The TMR read head of claim 2, wherein:
   more than 90% of all hafnium atoms in the non-magnetic dielectric material matrix are in an oxidized state; and
   more than 98% of all metal atoms in the nanocrystalline ferromagnetic particles are in an unoxidized state.

7. The TMR read head of claim 1, wherein the non-magnetic dielectric material matrix comprises a material selected from aluminum oxide, silicon oxide, zirconium oxide, titanium oxide, and tantalum oxide.

8. The TMR read head of claim 1, wherein the pair of side shields is spaced from the first magnetic shield by a planar portion of the electrical isolation dielectric layer having a planar surface that is parallel to an interface between the first magnetic shield and the sensor layer stack.

9. The TMR read head of claim 8, wherein the pair of side shields contacts a surface of the second magnetic shield that is parallel to the interface between the first magnetic shield and the sensor layer stack.

10. The TMR read head of claim 8, wherein:
    each of the pair of side shields contacts a respective tapered sidewall of the electrical isolation dielectric layer; and
    the pair of side shields is spaced from the planar portion of the electrical isolation dielectric layer by a pair of nonmagnetic spacers.

11. The TMR read head of claim 1, wherein:
    the pinned layer stack comprising an antiferromagnetic pinning layer and at least one ferromagnetic pinned layer; and
    the sensor layer stack further comprises a backside electrically conductive layer contacting the first magnetic shield, and a front side non-magnetic electrically conductive layer contacting the second magnetic shield.

12. A hard disk drive, comprising:
    a magnetic head containing the TMR read head of claim 1;
    a slider supporting the magnetic head;
    an actuator arm supporting the slider;
    a voice coil motor configured to control the actuator arm; and
    a magnetic disk.

13. The hard disk drive of claim 12, wherein a difference between an MT50 of the TMR read head and a free layer track width is less than 6.3 nm.

14. A method of forming a tunnel magnetoresistance (TMR) read head, comprising:
    forming a sensor layer stack including a pinned layer stack, a non-magnetic electrically insulating barrier layer, and a ferromagnetic free layer over a first magnetic shield;
    forming a read sensor stripe by patterning the sensor layer stack;
    forming an electrical isolation dielectric layer over sidewalls of the read sensor stripe;
    forming a pair of side shields over the electrical isolation dielectric layer and on both sides of the read sensor stripe, wherein the pair of side shields comprises nanocrystalline ferromagnetic particles embedded in a non-magnetic dielectric material matrix; and forming a second magnetic shield over the sensor layer stack.

15. The method of claim 14, wherein a combination of the nanocrystalline ferromagnetic particles and the non-magnetic dielectric material matrix is formed by a reactive ion beam sputtering process in which a target material including an alloy of hafnium and at least one magnetic element is sputtered over the electrical isolation dielectric layer by an argon ion beam in an oxygen-containing ambient.

16. The method of claim 15, wherein:
the non-magnetic dielectric material matrix comprises hafnium oxide;
the at least one magnetic element is selected from iron, cobalt, and a combination of iron and cobalt; and
the nanocrystalline ferromagnetic particles comprise a material selected from iron particles, cobalt particles, and particles of an alloy of iron and cobalt.

17. The method of claim 16, wherein:
the nanocrystalline ferromagnetic particles comprise the alloy of iron and cobalt;
an atomic ratio of iron atoms to cobalt atoms within the alloy of iron and cobalt range from 1/9 to 9; and
an atomic ratio of the at least one magnetic element to hafnium atoms within target material is in a range from 1 to 9.

18. The method of claim 16, wherein:
more than 90% of all hafnium atoms in the non-magnetic dielectric material matrix are in an oxidized state; and more than 98% of all metal atoms in the nanocrystalline ferromagnetic particles are in an unoxidized state.

19. The method of claim 14, wherein the non-magnetic dielectric material matrix comprises a material selected from aluminum oxide, silicon oxide, zirconium oxide, titanium oxide, and tantalum oxide.

20. The method of claim 14, wherein:
the pinned layer stack comprising an antiferromagnetic pinning layer and at least one ferromagnetic pinned layer;
the pair of side shields is spaced from the first magnetic shield by a planar portion of the electrical isolation dielectric layer having a planar surface that is parallel to an interface between the first magnetic shield and the sensor layer stack; and
the second magnetic shield is formed directly on top surfaces of the pair of side shields.

21. The method of claim 20, further comprising forming a pair of nonmagnetic spacers over the planar portion of the electrical isolation dielectric layer, wherein:
the pair of side shields is formed directly on the pair of nonmagnetic spacers; and
the pair of side shields is formed directly on a respective tapered sidewall of the electrical isolation dielectric layer.

* * * * *